L. C. MYERS.
RIBBON FEED SHIFT FOR TYPE WRITING MACHINES.
APPLICATION FILED DEC. 14, 1914.

1,161,509.

Patented Nov. 23, 1915.

WITNESSES:
L. L. Browning
Rosie Dobson

INVENTOR
Lewis C. Myers
BY Edward C. Davidson
ATTORNEY

UNITED STATES PATENT OFFICE.

LEWIS C. MYERS, OF BROOKLYN, NEW YORK, ASSIGNOR TO ROYAL TYPEWRITER COMPANY, INC., OF NEW YORK, N. Y., A CORPORATION OF NEW YORK.

RIBBON-FEED SHIFT FOR TYPE-WRITING MACHINES.

1,161,509. Specification of Letters Patent. Patented Nov. 23, 1915.

Application filed December 14, 1914. Serial No. 877,065.

*To all whom it may concern:*

Be it known that I, LEWIS C. MYERS, a citizen of the United States of America, residing in the borough of Brooklyn, county of Kings, and State of New York, have invented a certain new and useful Improvement in Ribbon-Feed Shifts for Type-Writing Machines, of which the following is a specification.

This invention relates to automatic reverse feeding mechanism of the ribbons of a typewriting machine, such as used in the Royal visible typewriter, and consists of improvements in certain parts of the ribbon mechanism disclosed in Patent No. 1,084,656 issued Jan. 20, 1914, and these improvements will now be fully described by reference to the accompanying drawings, in which—

Figure 1:
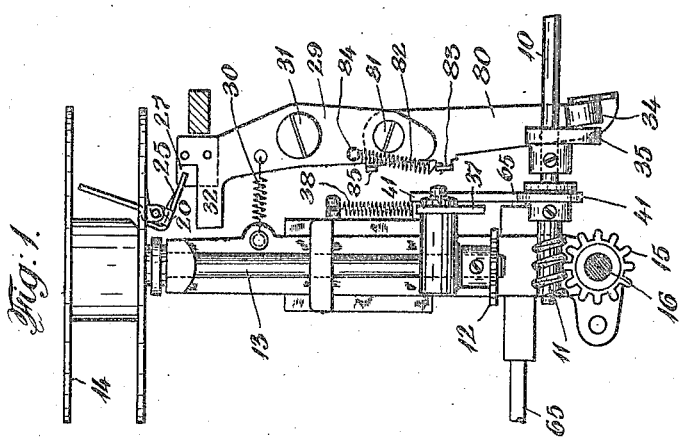
Figure 2:
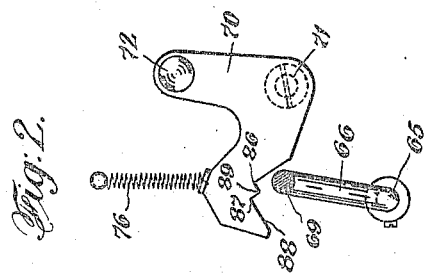

Figure 1 is an elevation of the left hand ribbon spool actuating mechanism viewed from the right hand side of the machine: and Fig. 2 illustrates an improvement in the device for disengaging the automatic control when it is desired to turn the ribbon spools manually.

All of the devices and parts of a typewriting machine shown in the drawings that are shown and described in the before mentioned patent are similarly indicated, and only such parts as directly relate to the present improvements are illustrated.

It will be understood that the shift of the ribbon feed of each spool will be automatically effected. As shown, the ribbon is assumed to have been unwound from the spool 14 and the shift actuating latch 20 to have moved into operative position with its arm 25 acting on the cam face 27 of the lever 29. This lever is pivoted at 31 to a suitable part of the frame and its cam face is moved in direction toward the spool by a spring 30, and, in the old device, this lever rigidly continues to its lower end and carries thereat a roller 34.

A shaft 10 carries at one of its ends a worm 11, and this end of the shaft is floating,—that is, it is adapted to move upwardly to set the worm in engagement with a worm wheel 12 secured to the lower end of a vertical shaft 13 that carries the ribbon spool 14 at its upper end and, when in its lower position, to engage the wheel 15 secured to shaft 16, as shown in the drawing. This shaft 16 extends across the machine and actuates the right hand ribbon spool. The other end of shaft 10 is connected through a universal joint to, and operated by, the carriage feed spring barrel mechanism. These parts are not here shown but fully shown and described in the earlier patent above mentioned.

The floating end of shaft 10 has a bearing in a lever 41 whose rocking center is the axis of a shaft 65 to which shaft the lever is secured. An upwardly extending arm of this lever is controlled by a locking arm 37 held up by a spring 38, the function and operation of which are fully described in the before mentioned patent.

A cam 35, having a gradual rise and a sudden drop from its highest to its lowest part, is secured to the shaft 10 in position to co-act with the roller 34, by said roller passing under the cam, when the spool latch 20 acts on the upper end of the lever 29. This lever, as before stated, is in the old device a continuous rigid piece and there is liability of the roller striking the side of the cam 35 should its high part be in the path of the roller when it is moving under the cam. Such action tends to impart an excessive strain to parts of the device and to the ribbon as it turns the spool 14 with its latch contacting with the cam face 27, and the obviation of this is the object of one feature of this invention. To this end the lever 29 is made flexible or yielding, the roller 34 being carried on the lower end of an arm or bar 80, the upper end of which is, by a suitable pivotal connection 81, attached to the lever 29 in such manner that, should the high part of the cam 35 be down when the roller 34 is moved laterally toward the cam, the arm 80 will rock on its center 81 as shown in the drawing. In so rocking tension is applied to a light spring 82 connected between a projection 83 of the arm 80 and a stud 84 on the lever. This spring 82, while adequately strong to set the roller 34 under the cam 35, as soon as the high part of the cam passes by the roller, is sufficiently delicate to prevent excessive or injurious strains on the latch 20 or on the ribbon. The roller 34 is properly located under the cam by the stop lug 85 on the upper end of arm 80 contacting with the side of the lever 29.

It will be understood that with the roller 34 under the cam 35, the floating end of the shaft 10 will be raised by the step-by-step movement of the carriage feed spring actuating means, and the worm 11 moved from wheel 15 of the right hand spool mechanism into action with the wheel 12 of the left hand spool upon which the ribbon will now be wound and the arm 25 of the latch 20 raised and held in position out of its sphere of action with the cam face of the lever 29.

Another feature of this invention resides in the device for disconnecting the automatic feed of the ribbon when it is desired to feed the ribbon from either spool to the other by hand. The shaft 65, to which is secured the lever 41, extends toward the front of the machine and has a crank 66 and an operating knob 69. By moving this knob to about central position, the worm 11 will be set inoperatively between the wheels 12 and 15; and to facilitate holding these parts in this position, a lever 70 is provided pivoted at 71 and having a notch adapted to seat over the upper part of crank 66 and held in this position by a knob 72. A spring 76 raises and holds the lever 70 away from the crank 66. With a single notch, as shown in the beforementioned patent, holding the worm in central position between wheels 12 and 15, the crank is liable to fall or move in either direction when released from the holding lever 70. To insure the crank and the worm moving back into the positions from which they are moved and held by the lever 70, this lever is provided with a double notch 86, 87, that is, the main notch or angular opening 88 has at its apex a small angular projection 89, thus producing at its sides the notches 86, 87. Referring to Fig. 2 it will be seen, the crank 66 being to the right and the worm 11 down in wheel 15, that upon depression of lever 70 the crank will be moved into notch 86 and the worm raised and that, as the crank is still to the right of central position, it will fall back to original position when released from the lever 70, the worm 11, of course, moving back to the wheel 15. With the crank in opposite position, to the left of a central line, and the worm acting on gear wheel 12, similar, but reverse actions, occur upon manipulation of the lever 70.

I claim:

1. A ribbon feed shift for typewriting machines, comprising a drive shaft having a bearing near one end in a rocking lever arm and a driving gear at this end, coacting gears for transmitting motion to the ribbon spools with which the shaft gear is adapted to alternately engage, a shift member carried by one of the spools, a yielding lever pivoted mediate its ends, with one end formed to be acted upon by the shift member and its other end provided with a roller and a cam on the drive shaft for coaction with the roller when the lever is moved by the shift member, said lever yielding should the roller strike the side of the high part of the cam, the roller passing into position for the cam to act thereon by the lever assuming normal condition when the high part of the cam moves away from the roller.

2. A ribbon feed shift for typewriting machines, comprising a drive shaft having a bearing near one end in a rocking lever arm and a driving gear at this end, coacting gears for transmitting motion to the ribbon spools with which the shaft gear is adapted to alternately engage, a shift member carried by one of the spools, a yielding lever pivoted mediate its ends, with one end formed to be acted upon by the shift member, an arm or bar pivotally connected to the other end of the lever, a roller at the free end of this bar, a spring for holding the bar in normal operative position on the lever, and a cam on the drive arranged to be acted upon by the roller to move the driving gear from one of its coacting gears to the other.

3. A ribbon feed shift for typewriting machines, comprising a drive shaft having a bearing near one end in a rocking lever arm and a driving gear at this end, coacting gears for transmitting motion to the ribbon spools with which the shaft gear is adapted to alternately engage, a shift member carried by one of the spools, a yielding lever pivoted mediate its ends, with one end formed to be acted upon by the shift member, an arm or bar pivotally connected to the other end of the lever, a roller at the free end of this bar, a spring connected with a lug on the bar and with the lever, a projection on the bar adapted to contact with the edge of the lever for holding the bar by the action of the spring in normal operative position on the lever, and a cam on the drive arranged to be acted upon by the roller to move the driving gear from one of its coacting gears to the other.

4. A ribbon feed shift for typewriting machines, comprising a drive shaft having a bearing near one end in a rocking lever arm and a driving gear at this end, coacting gears for transmitting motion to the ribbon spools with which the shaft gear is adapted to alternately engage, a shaft connected to the lever arm and with which it rocks, an upwardly extending crank arm on the shaft, and a notched arm adapted to engage with and hold the crank arm in position on either side of vertical central position, the driving gear of the drive shaft then being disengaged from both of its coacting gears.

5. A ribbon feed shift for typewriting machines, comprising a drive shaft having a bearing near one end in a rocking lever arm and a driving gear at this end, coacting gears for transmitting motion to the ribbon spools with which the shaft gear is adapted to alternately engage, a shaft connected to the lever arm and with which it rocks, an upwardly extending crank arm on the shaft, and a notched arm having a main augular recess and an angular projection at the apex thereof constituting two notches adapted to engage with and hold the crank arm in position on either side of vertical central position, the driving gear of the drive shaft then being disengaged from both of its coacting gears.

In testimony whereof, I have hereunto subscribed my name.

LEWIS C. MYERS.

Witnesses:
C. E. HESS,
GEORGE F. HANDLEY.

Copies of this patent may be obtained for five cents each, by addressing the "Commissioner of Patents, Washington, D. C."